United States Patent Office 3,421,526
Patented Jan. 14, 1969

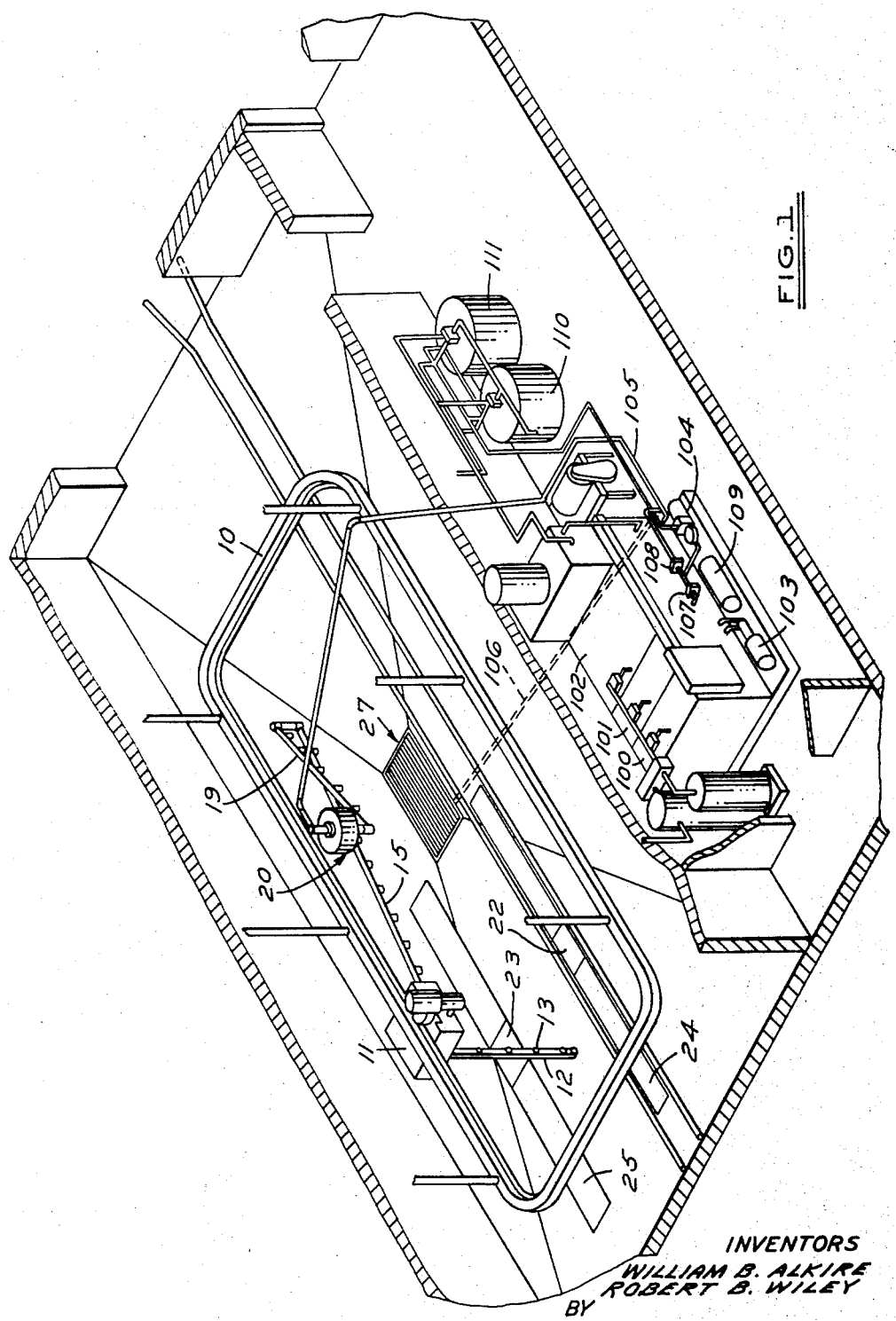

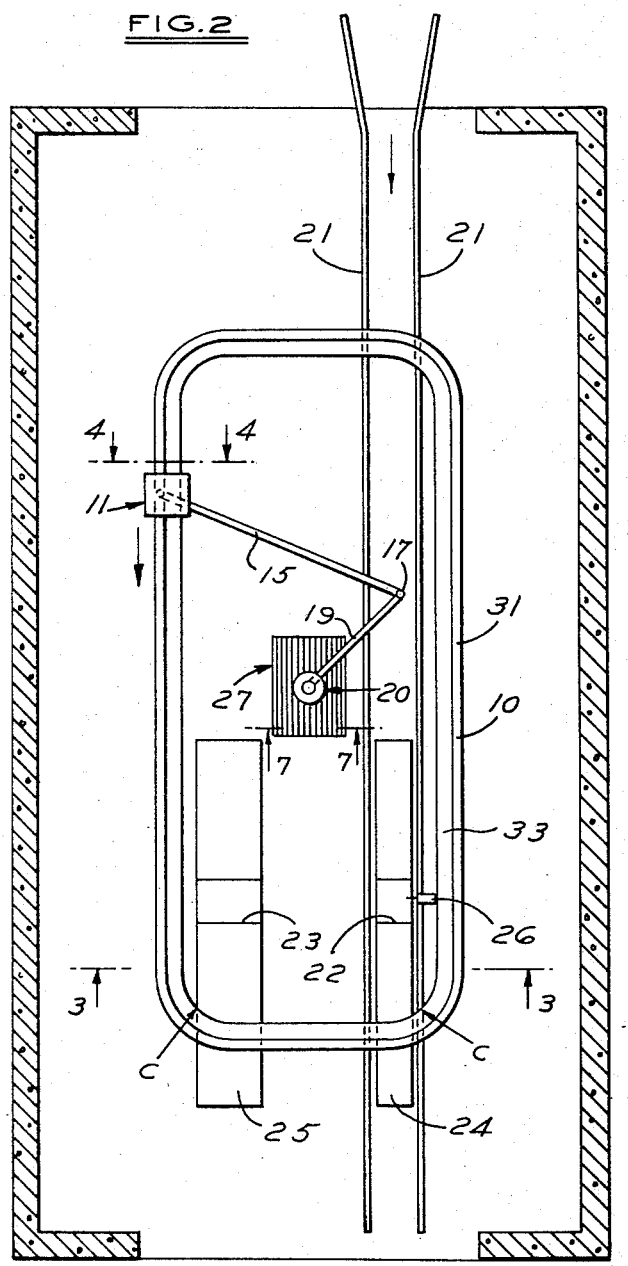

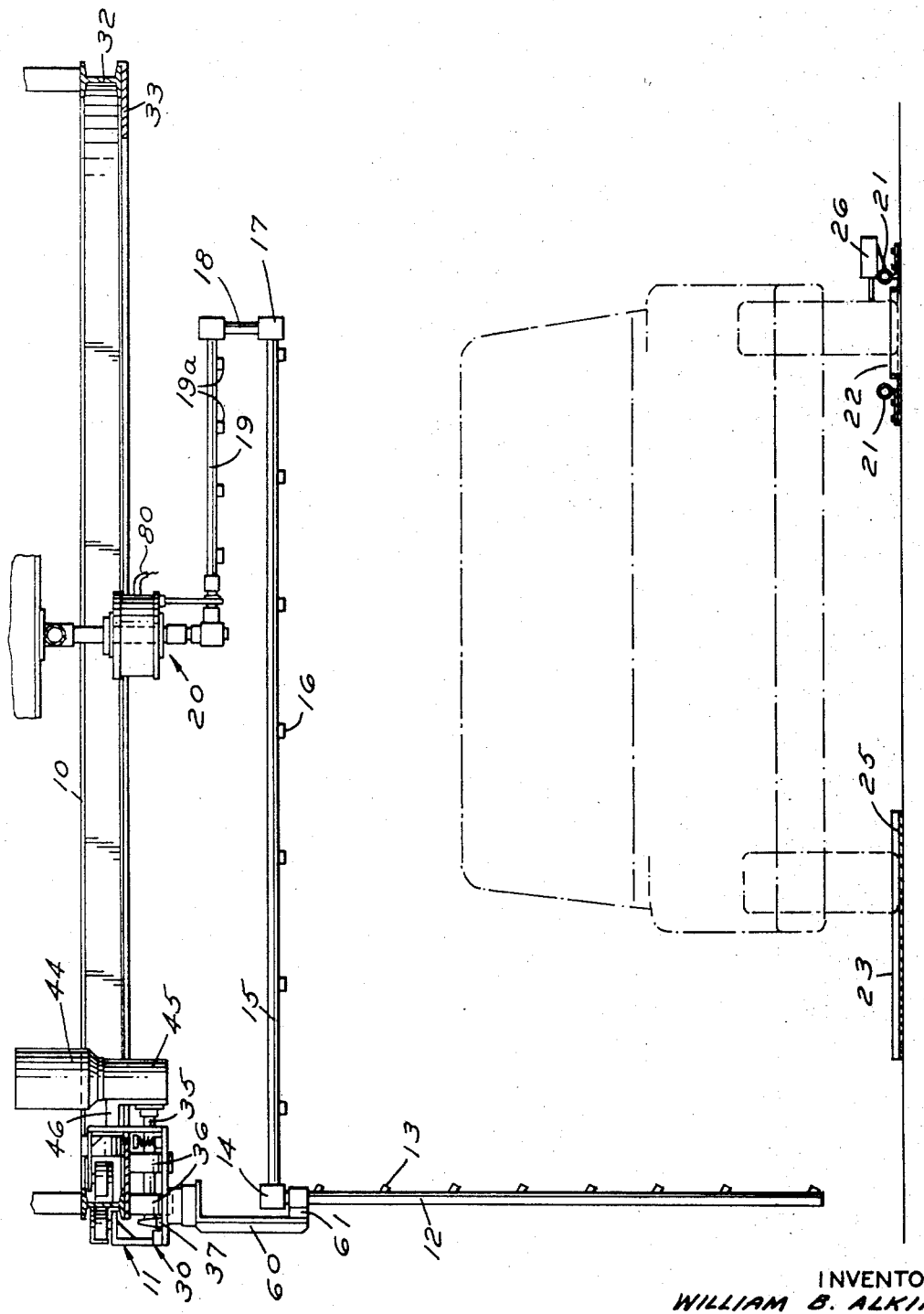

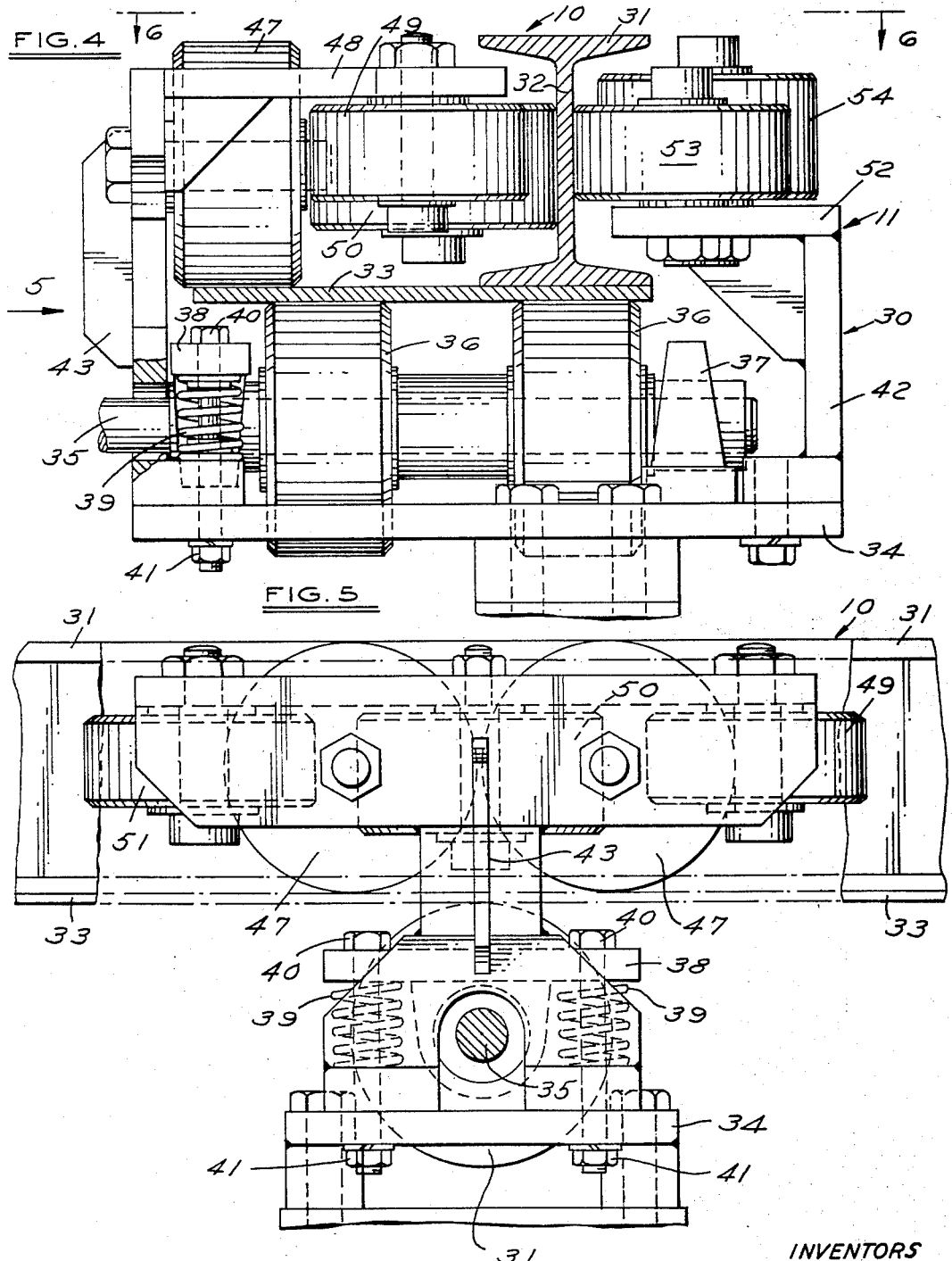

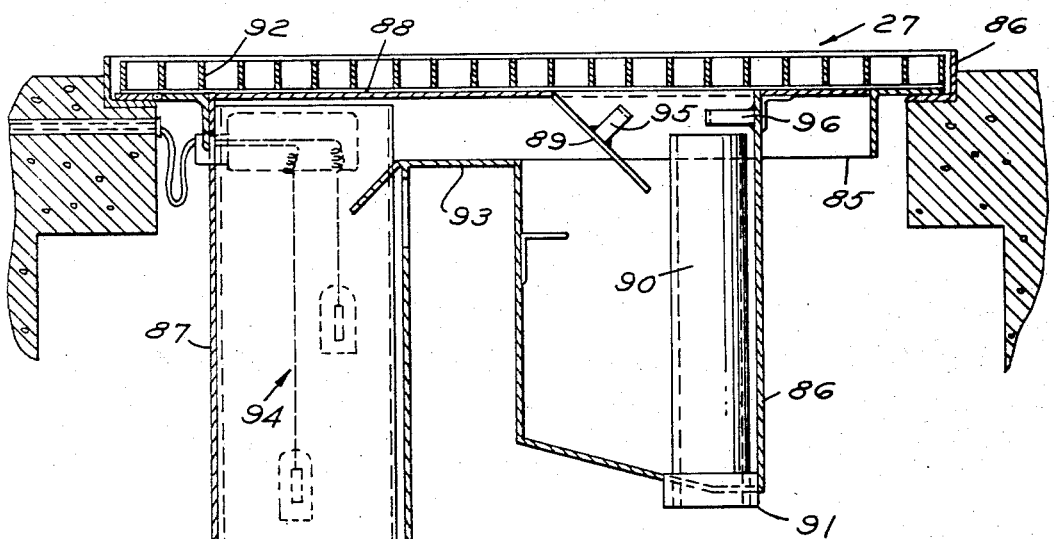
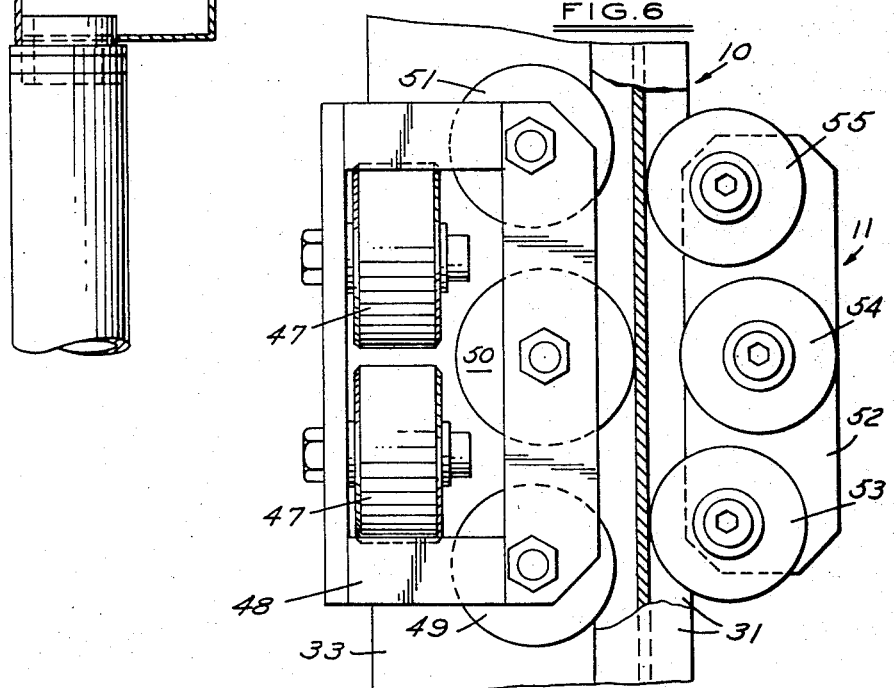

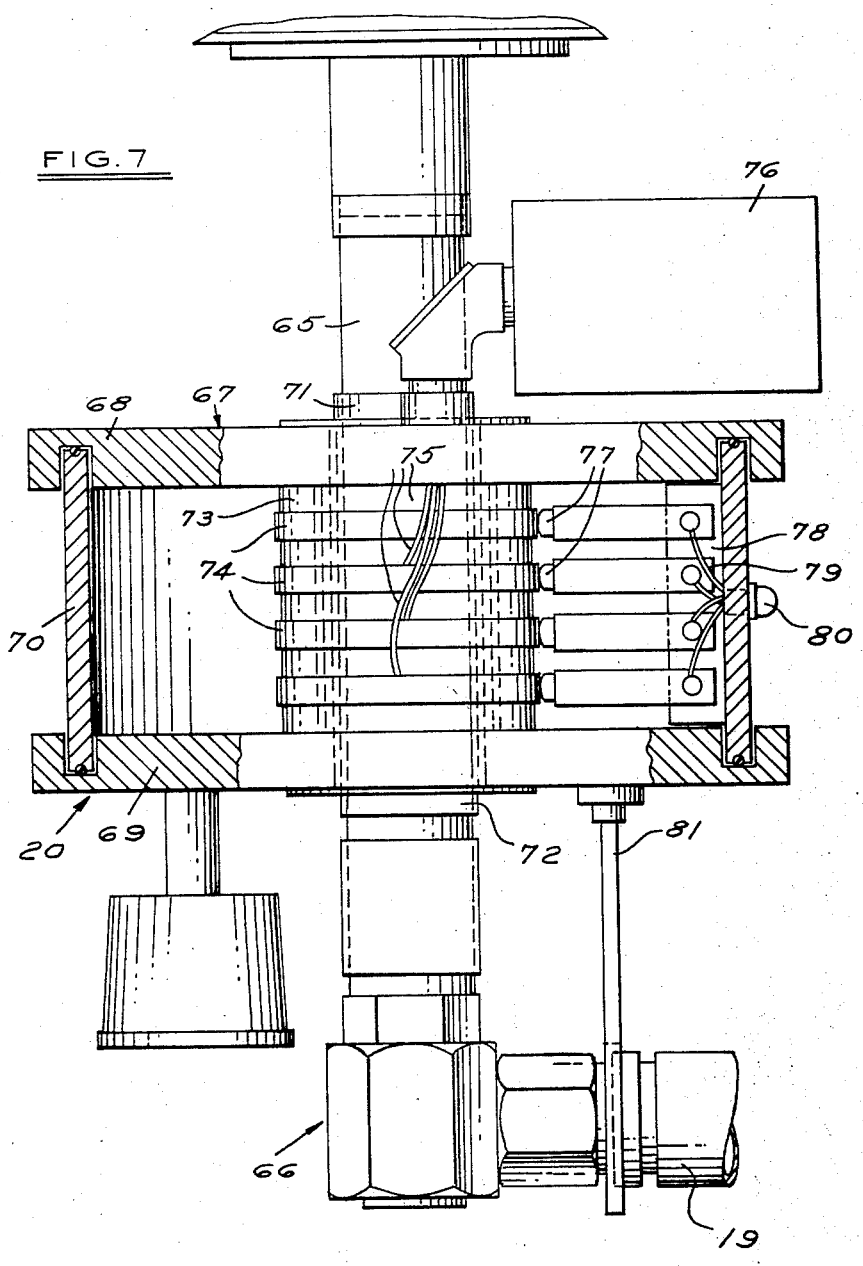

3,421,526
CARWASH SYSTEM
William B. Alkire, Detroit, and Robert B. Wiley, Grosse
Ile, Mich., assignors to Michael S. Polizzi, Grosse
Pointe Shores, Mich.
Filed Dec. 27, 1966, Ser. No. 604,676
U.S. Cl. 134—109                    22 Claims
Int. Cl. B08b 3/10; B60s 3/00

This invention relates to carwash systems and particularly to a carwash system wherein the car remains stationary during the washing operations.

Among the objects of the invention are to provide a carwash system which is relatively simple; requires a minimum of maintenance and supervision; efficiently washes and rinses the car; which has a novel trolley that is movable along an overlying endless track; which has a novel centrally supported electrical and liquid swivel assembly; and which has a novel drain assembly.

The carwash system disclosed herein comprises an endless track that is suspended above the carwashing station and supports a motor driven trolley for movement in an endless path around the car. The trolley supports a fixed vertical pipe that has laterally directed nozzles thereon for directing liquid at high pressure on the sides of the car as the trolley moves along the track. The upper end of the vertical pipe is connected by a swivel to one end of a horizontal pipe having downwardly directed nozzles thereon. The other end of the horizontal pipe is connected by a swivel to a second horizontal pipe having downwardly directed nozzles thereon which, in turn, is connected to a centrally located combined electrical and liquid supply assembly. The liquid draining from the car is collected in a novel sump assembly, filtered, replenished and returned for subsequent washing, as more completely described below.

In the drawings:

FIG. 1 is a fragmentary partly diagrammatic perspective view of the carwash system embodying the invention.

FIG. 2 is a fragmentary plan view of the carwash system.

FIG. 3 is a fragmentary sectional view on an enlarged scale taken along the line 3—3 in FIG. 2.

FIG. 4 is a fragmentary sectional view on an enlarged scale taken along the line 4—4 in FIG. 2.

FIG. 5 is a fragmentary view taken in the direction of the arrow 5 in FIG. 5.

FIG. 6 is a fragmentary sectional view taken along the line 6—6 in FIG. 4.

FIG. 7 is a part sectional elevational view on an enlarged scale of a portion of the apparatus shown in FIGS. 1 and 2.

FIG. 9 is a fragmentary sectional view taken along the line 9—9 in FIG. 8.

Figure 8:
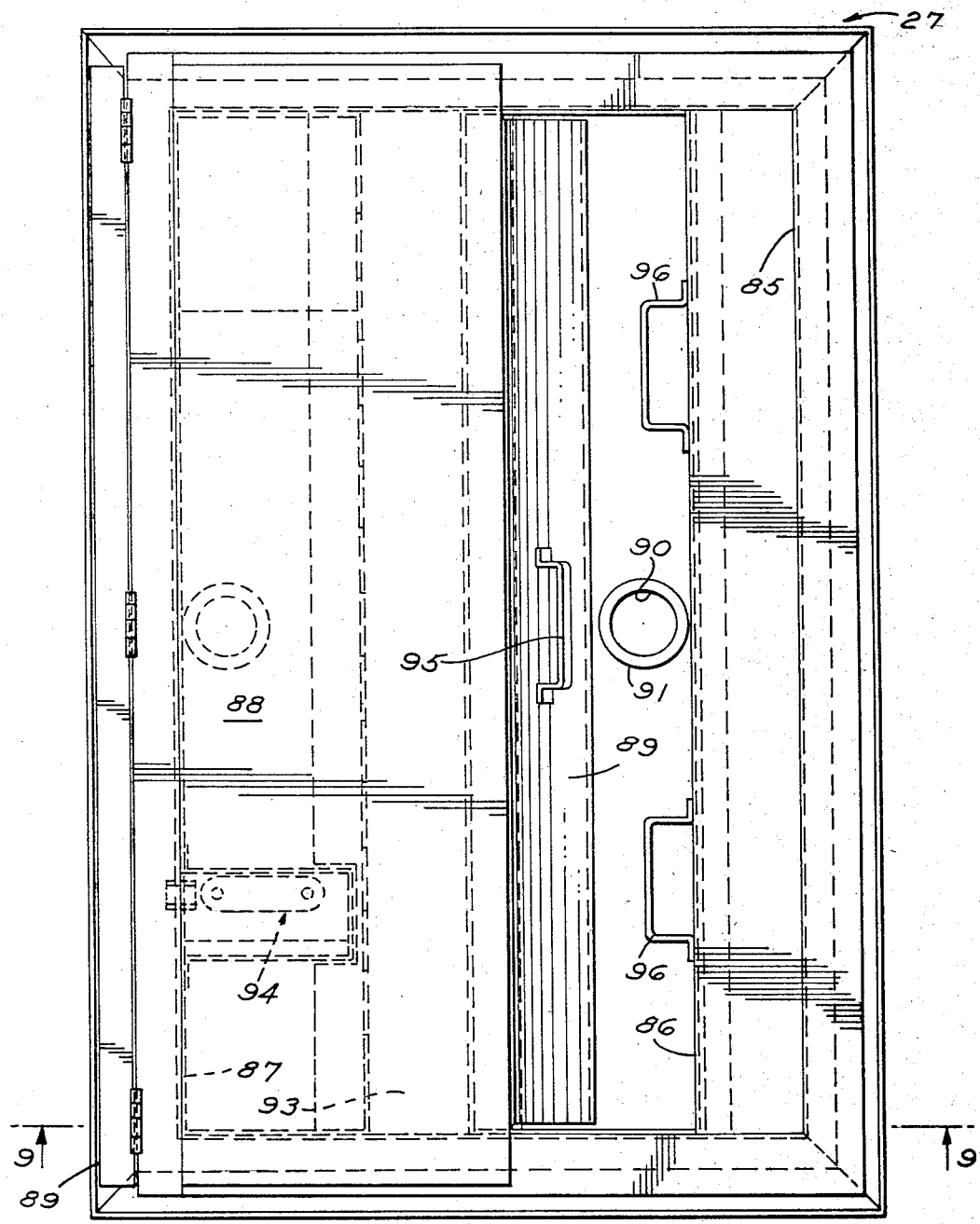
FIG. 8 is a plan view on an enlarged scale of the drain assembly shown in FIG. 1, parts being removed.

Referring to FIGS. 1 and 2, the carwash system comprises an endless track 10 that is suspended above a carwashing station and supports a motor driven trolley 11 for movement in an endless path around the car. The trolley 11 supports a fixed vertical pipe 12 that has liquid nozzles 13 thereon for directing liquid at high pressure on the sides of the car as the trolley 11 moves along the track 10. The upper end of the pipe 12 is connected by a swivel 14 to one end of a long horizontal pipe 15 having downwardly directed nozzles 16 thereon. The other end of the horizontal pipe 15 is connected by a swivel 17 and short vertical pipe 18 to a second short horizontal pipe 19 having downwardly directed nozzles 19a thereon which, in turn, is connected to a centrally located combined electrical and liquid supply assembly 20.

The assembly 20 is located centrally of the track 10 and the vertical pipe 12 is located vertically below the track 10. Pipe 15 is substantially longer than pipe 19, on the order of over twice as long, and the combined length of pipes 15 and 19 is greater than the distance from the center of assembly 20 to the furthest corners C of the track 10 (FIG. 2). By this arrangement, the swivel 17 between the pipes 15, 19 always lies to one side of the straight line connecting the center of the assembly 20 and pipe 12 and rearwardly with respect to the direction of movement of trolley 11. As the trolley 11 moves along the track 10, the pipes swivel about vertical axes relative to one another as shown in dotted lines in FIG. 2 so that liquid may be continuously supplied to the nozzles without interfering with the movement of the trolley 11.

As shown in FIG. 2, when a car is driven into carwash position, vertical extending guides 21 guide the car. When the car reaches the washing station, the front wheels enter depressions 22, 23 in metal plates 24, 25 on the floor indicating the proper position of the car for washing. At the same time, a switch 26 is operated by a wheel to initiate the washing cycle, as presently described. The floor is graded toward the center of the washing station so that liquid directed against the car drains to a drain assembly 27 which is more fully described below.

As shown in FIGS. 3–6, the trolley 11, shown with the cover removed, comprises a frame 30 on which a motor and drive and idler rolls are supported. Track 10 includes an I-beam 31 that has its web 32 extending vertically and a horizontal plate 33 welded to the bottom flange of the I-beam and extending radially inwardly of the track. Frame 30 includes a bottom plate 34 that rotatably supports a drive shaft 35 on which drive rolls 36, 37 are fixed. Specifically, one end of shaft 35 is rotatably supported by a fixed trunnion 37 while an intermediate portion thereof is resiliently supported by a spring loaded trunnion that includes a pressure block 38 and a pair of springs 39 that are tensioned by bolt 40 and nut 41.

Frame 30 further includes end plates 42, 43. An electric motor 44 having a gear reduction unit 35 thereon is supported by a bracket 46 on the plate 43. Plate 43 also supports a pair of idler rollers 47 for rotation about horizontal axes and a secondary bracket 48 which supports idler rollers 49, 50, 51 of equal diameter for rotation about vertical axes. Plate 42 also supports a secondary bracket 52 which, in turn, supports idler rollers 53, 54, 55 of equal diameter for rotation about vertical axes.

Drive rollers 36 engage the underside of the track plate 33 with one of the drive rollers 36 underlying the I-beam 31. Idler rollers 47 engage the top of track plate 33 adjacent the radially innermost portion thereof. Idler rollers 49, 50, 51 are adapted to engage the radially inner surface of web 32 while idler rollers 53–55 are adapted to engage the radially outer surface of the web 32. The axis of rotation of central roller 50 is positioned radially outwardly of the plane connecting the axes of rollers 49, 50. Similarly, the axis of roller 54 is positioned radially outwardly of the plane connecting the axes of rollers 53, 55. By this arrangement, the movement of the trolley around the corners of the track 10 is greatly facilitated since the idler rollers thereby accommodate for the curved portion of the web 32 of the track at the corners.

When the motor 44 is energized, as presently described, the drive rollers 36 frictionally engage the underside of the track plate 33 and drive the trolley along the track 10. The idler rollers stabilize the movement of the trolley both horizontally and vertically as it moves along the track 10. The drive and idler rollers are preferably made of polyurethane.

As shown in FIG. 3, a generally U-shaped bracket 60 is mounted on the underside of frame plate 34 and has an arm 61 on which the pipe 12 is fixed.

Referring to FIG. 7, the combined electric and supply assembly 20 is provided centrally of the track 10 and in overlying relation to the carwash station for supplying electrical power to the motor 44 of the trolley 11 and liquid, in the form of a washing solution or rinsing solution, to the pipes 15, 12 and, in turn, the nozzles 16, 13. As shown in FIG. 7, the liquid is supplied to the upper end of a pipe 65 which is fixed to the ceiling or roof. A swivel connection 66 on the lower end of the pipe 65 connects the short horizontal pipe 19 to the pipe 65. Thus, solution supplied through pipe 65 may flow through pipes 19, 15, 12 to nozzles 16, 13, 19a.

A housing 67 comprising an upper wall 68, lower wall 69 and a cylindrical wall 70 is mounted on the pipe 65. Specifically, a cap 71 is fixed to the upper wall 68 and is fixed to the pipe 65. The lower wall 69 is rotatably mounted on the pipe 65 by a bracket 72 and the wall 70 is fixed to the bottom wall 69 for rotation therewith by bracket 72.

As insulator cylinder 73 is fixed to the upper wall 68 and supports a plurality of slip rings 74 to which power is supplied by wires 75 through an external control box 76. Spring loaded brushes 77 are mounted on a bracket 78 fixed to the cylindrical wall 70 and ride on the slip rings 74. The brushes are, in turn, connected by wires 79 to an external cable 80. A follower arm 81 is fixed to the lower wall 69 and extends downwardly into position for engagement by the pipe 19 so that as the pipe 19 moves, it carries with it the arm 81 and rotates the brushes 77 relative to the ring 74. As shown in FIG. 3, the cable 80 extends along and is fastened by tape to the pipes 19, 15 and, in turn, to the motor 44.

Referring to FIGS. 8 and 9, the drain assembly 27 is placed in an opening in the floor and comprises a frame 85, the periphery of which engages a rectangular support member 86 mounted along the periphery of the opening. The frame 85, in turn, supports a settling tank 86 and an overflow tank 87. A deflector plate 88 is hinged to the frame 85 by hinges 89 and overlies the overflow tank 87. Plate 88 includes a downwardly extending free edge 89 that overlies the settling tank 86. A removable stand pipe 90 extends vertically downwardly into a bottom opening 91 in the settling tank 86. A grill 92 overlies the entire frame 85. The grill 92 has been removed from the apparatus shown in FIG. 8.

Liquid draining from the car flows to the drain assembly 27. The liquid flows either directly into the tank 86 or over the plate 88 and deflector 89 into the tank 86. An overflow shelf or plate 93 interconnects the tanks 86, 87. In the tank 86, the solids tend to settle to the bottom and as the level of liquid rises above the shelf 93, the liquid overflows into the overflow tank 87. From the tank 87, the liquid is taken periodically to the filter and replenishing system presently described. Liquid level controls 94 of conventional construction are provided.

As shown in FIGS. 8 and 9, handles 95, 96 are provided to facilitate lifting of plate 88 and removal of the frame 85 as may be required for maintenance.

Referring to FIG. 1, the fluid circuit and associated apparatus utilized in connection with the carwash system is shown diagrammatically and comprises a rinse supply tank 100, a detergent supply tank 101 and a tank 102 for washing solution comprising detergent and water. A pump 103 continuously agitates the detergent solution in tank 101 by recirculating the solution therein. A pump 104 continuously supplies solution to the swivel assembly 20 through a line 105. Pump 104 is adapted to selectively draw solution from the tank 87 through line 106 or from the tank 102 depending upon which of the valves 107, 108 is open. Valves 107, 108 are mechanically interconnected and are operated by an air motor 109 that is controlled by the level controls 94 in the tank 87 (FIG. 9). When the level of the liquid in tank 87 rises, valve 108 is opened so that the liquid flows from line 106 through the pump 104 to line 105 while the valve 107 is closed. When the level of liquid in the tank 87 drops below a predetermined level, valve 108 is closed and valve 107 is open so that washing solution flows from the tank 102 through the pump to the line 105. The washing solution from the drain pit first passes through filter units 110, 111 before passing to the pump 104.

We claim:
1. In a stationary carwash system, the combination comprising
   an endless track below which a car to be washed is positioned,
   a trolley mounted for movement along said endless track,
   an electric motor on said trolley for driving said trolley along said track,
   a nozzle assembly moved by said trolley including horizontally and vertically disposed nozzles for spraying liquid against the top and sides of the car as the trolley is moved along the track,
   a source of liquid,
   a source of electricity,
   means generally centrally disposed with respect to the track and providing a swivel connected between said liquid and electric sources and the nozzle assembly and electric motor, respectively,
   and means for selectively actuating the liquid and electric source, said track including an annular vertical web and an annular horizontal web, said trolley including drive rolls driven by said electrical motor and engaging the underside of said horizontal web, and idler rolls engaging opposite sides of the vertical web and the top side of said horizontal web.

2. The combination set forth in claim 1 wherein said horizontal web extends radially inwardly of said vertical web of the track.

3. The combination set forth in claim 1 wherein the drive rolls comprise a pair of transversely spaced rollers engaging the underside of the horizontal web and the idler roller which engages the top side of the horizontal web disposed radially inwardly with respect to the drive rollers.

4. The combination set forth in claim 1 wherein said idler rolls that are disposed on opposite sides of the vertical web comprise a plurality of rollers disposed on the radially outer side of the vertical web,
   one of said last-mentioned rolls having its periphery disposed radially inwardly of the peripheries of others of said last-mentioned rolls,
   and a plurality of idler rollers disposed radially inwardly on the opposite side of the vertical web,
   one of said last-mentioned rolls having its periphery disposed radially outwardly beyond the peripheries of others of said last-mentioned rollers.

5. The combination set forth in claim 4 wherein one of the plurality of rollers disposed adjacent the inner side of the vertical web has a greater diameter than others of said rollers adjacent the inner side of the vertical web.

6. The combination set forth in claim 1 wherein said swivel means comprises a generally vertically extending pipe adapted to be connected to the source of liquid,
   a housing surrounding and mounted on said pipe,
   a plurality of vertically spaced annular collector rings electrically insulated and mounted on said pipe,
   a plurality of electrical brushes rotatably mounted on said housing and engaging said collector rings, electrical conduit means extending from said brushes to said electrical motor, and liquid conduit means extending from said pipe to said nozzle assembly.

7. The combination set forth in claim 1 wherein said nozzle assembly comprises a vertically extending arm and a horizontally extending arm pivoted at one end to said horizontally extending arm and a plurality of spray nozzles mounted on each of said arms.

8. The combination set forth in claim 1 wherein said nozzle assembly comprises a vertical pipe mounted on said trolley and having a plurality of laterally directed nozzles thereon, a first horizontal pipe pivoted to the upper end of said vertical pipe at one end, a second horizontal pipe pivoted at one end to the other end of said first horizontal pipe and at its other end to said swivel connection means, said first and second horizontal pipes having downwardly directed nozzles thereon.

9. The combination set forth in claim 8 wherein said first horizontal pipe is longer than said second horizontal pipe.

10. The combination set forth in claim 1 including a drain pit beneath said endless track and generally centrally located with respect thereto, a pump assembly in said drain pit comprising a pair of horizontally displaced chambers having open upper ends, a baffle covering one of said chambers whereby liquid drains substantially only into the other of said chambers, a standpipe in the other of said chambers, and an overflow connection between the other of said chambers and said first-mentioned chamber.

11. The combination set forth in claim 10 wherein said standpipe is removable.

12. The combination set forth in claim 10 wherein said sump assembly is vertically removable.

13. The combination set forth in claim 10 including a removable grill over said drain pit.

14. The combination set forth in claim 1 including a drain pit beneath said endless track into which liquid drains, a pump, a solution tank, and valve means for selectively connecting said pump to said solution tank or said drain pit.

15. In a stationary carwash system, the combination comprising an endless track below which a car to be washed is positioned, a trolley mounted for movement along said endless track, an electric motor on said trolley for driving said trolley along said track, a nozzle assembly comprising a vertical pipe mounted on said trolley and having a plurality of laterally directed nozzles thereon, a first horizontal pipe pivoted to the upper end of said vertical pipe at one end, a second horizontal pipe pivoted at one end to the other end of said first horizontal pipe and at its other end to said swivel connection means, said first and second horizontal pipes having downwardly directed nozzles thereon.

16. The combination set forth in claim 15 wherein said first horizontal pipe is longer than said second horizontal pipe.

17. In a stationary carwash system, the combination comprising an endless track below which a car to be washed is positioned, a trolley mounted for movement along said endless track, an electric motor on said trolley for driving said trolley along said track, a nozzle assembly moved by said trolley including horizontally and vertically disposed nozzles for spraying liquid against the top and sides of the car as the trolley is moved along the track, said track including an annular vertical web and an annular horizontal web, said trolley including drive rolls driven by said electrical motor and engaging the underside of said horizontal web, and idler rolls engaging opposite sides of the vertical web and the top side of said horizontal web.

18. The combination set forth in claim 17 wherein said horizontal web extends radially inwardly of said vertical web of the track.

19. The combination set forth in claim 17 wherein the drive rolls comprise a pair of transversely spaced rollers engaging the underside of the horizontal web and the idler roller which engages the top side of the horizontal web disposed radially inwardly with respect to the drive rollers.

20. The combination set forth in claim 17 wherein said idler rolls that are disposed on opposite sides of the vertical web comprise a plurality of rollers disposed on the radially outer side of the vertical web, one of said last-mentioned rolls having its periphery disposed radially inwardly of the peripheries of others of said last-mentioned rolls, and a plurality of idler rollers disposed radially inwardly on the opposite side of the vertical web, one of said last-mentioned rolls having its periphery disposed radially outwardly beyond the peripheries of others of the said last-mentioned rollers.

21. The combination set forth in claim 20 wherein one of the plurality of rollers disposed adjacent the inner side of the vertical web has a greater diameter than others of said rollers adjacent the inner side of the vertical web.

22. In a stationary carwash system, the combination comprising an endless track below which a car to be washed is positioned, a trolley mounted for movement along said endless track, an electric motor on said trolley for driving said trolley along said track, a nozzle assembly moved by said trolley including horizontally and vertically disposed nozzles for spraying liquid against the top and sides of the car as the trolley is moved along the track, a source of liquid, a source of electricity, means generally centrally disposed with respect to the track and providing a swivel connection between said liquid and electrical sources ad the nozzle assembly and electric motor, respectively, said swivel means comprising a generally vertically extending pipe adapted to be connected to the source of liquid, a housing surrounding and mounted on said pipe, a plurality of vertically spaced annular collector rings electrically insulated and mounted on said pipe, a plurality of electrical brushes rotatably mounted on said housing and engaging said collector rings, electrical conduit means extending from said brushes to said electrical motor, and liquid conduit means extending from said pipe to said nozzle assembly.

References Cited

UNITED STATES PATENTS 1,907,411  5/1933  Timoney _____ 134—123 XR
2,013,742  9/1935  Butler _____ 134—45

(Other references on following page)

UNITED STATES PATENTS

| | | | |
|---|---|---|---|
| 2,139,096 | 12/1938 | Piquerez | 134—123 XR |
| 2,382,194 | 8/1945 | Wood. | |
| 2,896,857 | 7/1959 | Tompkins | 134—123 XR |
| 2,922,173 | 1/1960 | Lind et al. | 134—109 XR |
| 3,167,797 | 2/1965 | Hergonson | 134—123 XR |
| 3,299,901 | 1/1967 | Axe et al. | 134—123 |
| 3,339,563 | 9/1967 | Ordonez | 134—181 XR |
| 3,378,018 | 4/1968 | Lawter | 134—123 XR |

ROBERT L. BLEUTGE, *Primary Examiner.*

U.S. Cl. X.R.

134—123, 181